C. A. RICHARD.
LUBRICATOR MECHANISM.
APPLICATION FILED OCT. 16, 1914.
1,162,253.
Patented Nov. 30, 1915.
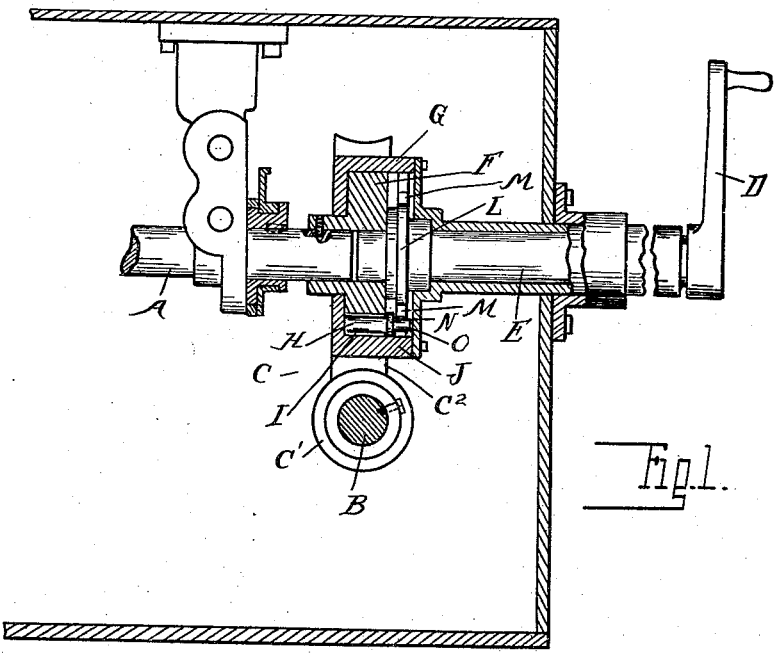
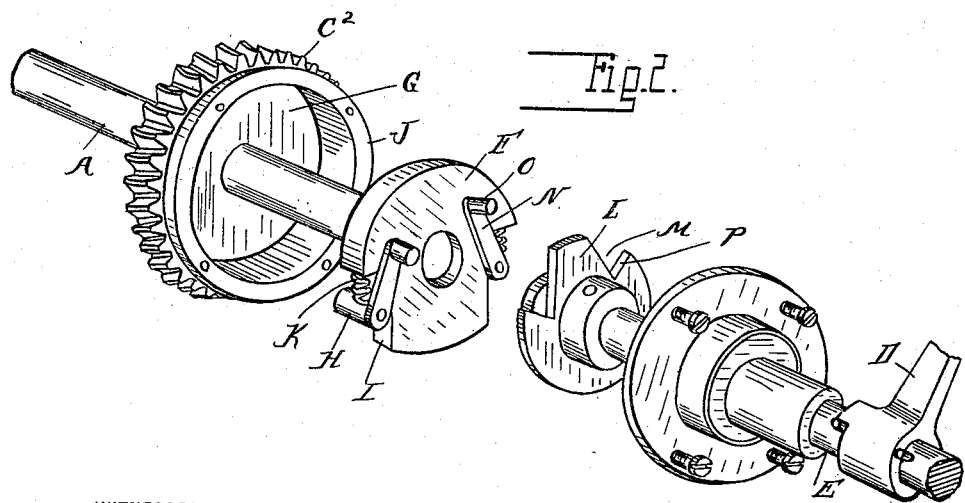
WITNESSES:
W. K. Ford
James P. Barry
INVENTOR
Clarence A. Richard
BY
Whittemore Hulbert & Whittemore
ATTORNEYS

UNITED STATES PATENT OFFICE.

CLARENCE A. RICHARD, OF DETROIT, MICHIGAN, ASSIGNOR TO DETROIT LUBRICATOR COMPANY, OF DETROIT, MICHIGAN, A CORPORATION OF MICHIGAN.

LUBRICATOR MECHANISM.

1,162,253.     Specification of Letters Patent.     Patented Nov. 30, 1915.

Application filed October 16, 1914. Serial No. 866,953.

*To all whom it may concern:*

Be it known that I, CLARENCE A. RICHARD, a citizen of the United States of America, residing at Detroit, in the county of Wayne and State of Michigan, have invented certain new and useful Improvements in Lubricator Mechanisms, of which the following is a specification, reference being had therein to the accompanying drawings.

The invention relates to force feed lubricators and it is the object of the invention to provide a mechanical drive mechanism rotatable in either direction, which permits also of hand operation when desired.

Mechanically driven lubricators when in normal operation are usually driven at the minimum speed which will supply the required amount of oil or other lubricant. The feeding of the lubricant is so slow that when the mechanism is started considerable time is necessary for filling the conduits between the lubricator and the bearings to be lubricated. Inasmuch as the lubricator is generally driven from the machine to be lubricated there is danger of injuring the latter in its initial operation before the lubricant reaches the bearing. To avoid this difficulty I have provided means for operating the lubricator by hand independent of the mechanical drive. There is, however, this difficulty encountered, viz.—the mechanical drive mechanism is rotatable in either direction and consequently the hand actuating device must be operable in either direction and must not interfere with the operation of the mechanical drive in either direction. I have therefore devised a mechanism which accomplishes the desired result, the construction being as hereinafter described.

In the drawings: Figure 1 is a sectional elevation through a portion of a lubricator to which my improvement is applied; and Fig. 2 is a perspective view showing the detached parts of the hand drive and clutch in position for engagement with each other.

A is the driven shaft of the lubricator, B is the drive shaft therefor, and C is a step-down gearing between said shafts, which as shown comprises the worm C' fixed on the shaft B and the worm wheel $C^2$ loose on the shaft A. Thus the speed of rotation of the driven shaft is relatively slow to that of the drive shaft.

D is a hand crank for rotating the driven shaft A independently of its connection with the drive shaft B. This hand crank is secured to a shaft E which is axially alined with the shaft A and is connected therewith by a mechanism of the following construction.

F is a head fixed to the shaft A and housed within a recess G in the worm wheel $C^2$.

H are rolls engaging angular recessed bearings I in the head F and constituting in connection therewith and the annular flange J of the worm wheel $C^2$ a roller clutch. The arrangement is such that the rotation of the wheel $C^2$ in one direction will frictionally engage one of the rolls H so as to drive the head F, while the rotation of the wheel G in the opposite direction will correspondingly engage the other of said rolls H, thereby coupling the wheel and head to rotate together in either direction. The rolls or dogs H are normally held in friction engagement by springs K.

To permit of rotating the shaft A independent of the wheel $C^2$ it is necessary to release one of the clutches H, the other clutch releasing automatically. This result is accomplished whenever the handle D is rotated by mounting upon the shaft E a clutch-releasing member L. As shown this member L is in the form of a head or disk arranged adjacent to the head F and having notches M in its periphery.

N are links connected to the rolls H and having laterally-projecting pins O for engaging the notches M and bearing against shoulders P in said notches. Thus whenever the crank D is revolved in either direction the shoulder P engaging the pin O will draw the link N so as to move the roller H against the tension of the spring K and withdraw it from frictional engagement with the annular flange J of the wheel $C^2$. This will disconnect the clutch from said wheel, while the link N will constitute a coupler between the head F and the head L so that the further rotation of the crank D will communicate its motion to the shaft A.

With the mechanism constructed as above described it is obvious that whenever it is desired to operate the lubricator by hand the crank B may be revolved and the shaft A driven thereby at the same angular speed, whereas the driving of said shaft through the worm gearing is at greatly reduced angular speed. This will permit of the initial operation of the lubricator by hand, so as to fill the conduits with oil and insure the lubrication of the bearings of the mechanism as first started. Furthermore the construction is such that it is immaterial in which direction the shafts A and B revolve and it is equally immaterial whether the handle D is revolved in the same direction or the reverse direction from the shaft B.

What I claim as my invention is:—

1. In a lubricator, the combination with a shaft, of a transmission mechanism normally driving the shaft, an auxiliary transmission mechanism for driving the shaft, and means automatically disconnecting the normal transmission from the shaft when the auxiliary transmission mechanism is in use.

2. In a lubricator, the combination with the drive shaft and driven shaft, of a step-down transmission between said drive shaft and driven shafts operable by rotation in either direction, a hand crank for operating said driven shaft, and means operating upon the actuation of said crank for releasing said driven shaft from said drive shaft.

3. In a lubricator, the combination with a drive shaft and a driven shaft, of a step-down worm gearing intermediate said shafts, a hand crank for actuating said driven shaft, and a coupling between said driven shaft, worm gearing and hand crank operable to disconnect said gearing from said driven shaft when actuated by said crank.

4. In a lubricator, the combination with a driven member, of a drive member for rotating said driven member in either direction, a hand crank for also operating said driven shaft in either direction, and means operable by the rotation of said hand crank for releasing said driven member from said drive member.

5. In a lubricator, the combination with the drive shaft and the driven shaft, of a step-down worm gearing therebetween, a pair of clutches for coupling said driven shaft to said gearing when rotated in either direction, a hand crank, and a coupling connection between said hand crank and driven shaft operable to release said clutches respectively when rotated in opposite directions to disconnect said gearing from said driven shaft.

6. In a lubricator, the combination with a drive shaft and a driven shaft, of a worm fixed on said drive shaft, a worm wheel sleeved on said driven shaft, a head rotatively fixed to said driven shaft engaging a recess in said worm wheel, clutches for coupling said head to said worm wheel when respectively rotated in opposite directions, a hand crank axially alined with said driven shaft, and a linkage between said hand crank and clutches for releasing the coupling to said worm wheel and for effecting a driving coupling with said driven shaft and in either direction of rotation of said crank.

7. In a lubricator, the combination with a shaft, of a normal and an auxiliary drive mechanism for said shaft, each of said mechanisms being operable to drive the shaft in either direction, and means automatically disconnecting the normal transmission when the auxiliary transmission is in use.

In testimony whereof I affix my signature in presence of two witnesses.

CLARENCE A. RICHARD.

Witnesses:
  J. A. HIGINBOTHAM,
  E. G. MATTINO.

Copies of this patent may be obtained for five cents each, by addressing the "Commissioner of Patents, Washington, D. C."